United States Patent
Schisler

(10) Patent No.: US 6,923,434 B2
(45) Date of Patent: Aug. 2, 2005

(54) DUAL HEIGHT AIRSPRING HAVING ADJUSTED SPRING RATE

(75) Inventor: Robert Charles Schisler, Munroe Falls, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 10/706,761

(22) Filed: Nov. 10, 2003

(65) Prior Publication Data
US 2005/0098931 A1 May 12, 2005

(51) Int. Cl.[7] .................................................. F16F 9/04
(52) U.S. Cl. ........................... 267/64.27; 267/64.19; 267/64.23
(58) Field of Search ....................... 267/64.27, 122, 267/64.19, 64.21, 64.16, 64.23, 64.25

(56) References Cited

U.S. PATENT DOCUMENTS

| | | | |
|---|---|---|---|
| 4,629,170 A | * 12/1986 | Warmuth, II | ............ 267/64.27 |
| 5,413,316 A | 5/1995 | Easter | |
| 5,580,033 A | 12/1996 | Burkley et al. | |
| 6,332,602 B1 | * 12/2001 | Oishi | ......................... 267/122 |
| 6,386,524 B1 | * 5/2002 | Levy et al. | ............... 267/64.27 |
| 6,511,057 B1 | * 1/2003 | Berg | ........................ 267/64.27 |
| 6,561,500 B2 | 5/2003 | Schisler et al. | |

FOREIGN PATENT DOCUMENTS

| | | |
|---|---|---|
| DE | 3531542 | 4/1986 |
| JP | 3107630 | 5/1991 |
| JP | 3177633 | 8/1991 |

* cited by examiner

Primary Examiner—Douglas C. Butler
Assistant Examiner—Melanie Torres
(74) Attorney, Agent, or Firm—Richard B. O'Planick

(57) ABSTRACT

An air spring having a relatively low and a relatively high spring height includes a retainer, a base housing, an elastomeric sleeve secured to the retainer at a first end and secured to the base housing at a lower end to form a chamber, the elastomeric sleeve expanding from a relatively collapsed configuration at the low air spring height into an expanded configuration at the high air spring height. A confined bladder is disposed within the chamber, the bladder being inflatable to displace a variable portion of an expanded volume within the sleeve chamber at the high air spring height. The spring rate of the air spring is adjusted by an adjustment to the volume of air displaced by the inflated bladder within the sleeve chamber and by overpressurizing the bladder relative to the air spring sleeve, whereby the air spring is adapted to provide a relatively low spring rate at the lower height and a relatively high spring rate at the higher height.

20 Claims, 4 Drawing Sheets

DUAL HEIGHT AIRSPRING HAVING ADJUSTED SPRING RATE

FIELD OF THE INVENTION

The present invention relates generally to air springs and, in particular, to a height and spring rate adjustable air spring.

BACKGROUND OF THE INVENTION

Air springs are in common use for motor vehicles and various machines and other equipment. The springs are designed to support a suspension load such as a vehicle. The springs are often combined with a separate shock absorber device in the suspension that functions to dampen oscillations. Air springs typically consist of a flexible elastomeric reinforced sleeve that extends between a pair of end members. The sleeve is attached to end members to form a pressurized chamber therein. The end members mount the air spring on spaced components or parts of the vehicle or equipment on which the air spring is to be mounted.

The internal pressurized gas, usually air, absorbs most of the motion impressed upon or experienced by one of the spaced end members by which the air spring is mounted. The end members move inward toward each other and also away as the motion of the suspension requires.

It is desired in certain applications to provide an air spring for an automotive suspension system designed to operate at two or more suspension ride heights. Such a spring typically will have a fabric reinforced rubber sleeve that forms a rolling lobe that rolls on a piston(s) at either one or both ends of the spring. The piston(s) can either be cylindrical or have conical tapers that will either increase the spring rate with a positive taper or decrease the spring rate with a negative taper. A multiple ride height air spring will have the lobe rolling over different portions of the piston(s) at each height, and these different piston portions can have specific conical tapers to influence the spring rate at that ride height.

With a multi-ride height suspension, it is often desirable, such as in off-road SUV vehicles, to have a higher suspension spring rate at the taller or higher suspension ride height(s) to improve vehicle stability, safety, and ride comfort, when driving over uneven surfaces. In order to move the air spring from a shorter height to a taller height, it is typical to add a large amount of internal air volume to the air spring. This additional internal air volume, however, greatly reduces the spring rate of the air spring well beyond the capability of design tools such as piston tapering or other air spring shaping to correct. The reduction in air spring rate attendant the taller height mode of operation thus n's counter to the desired objective of a higher spring rate at higher heights in order to achieve the aforementioned off-road performance objectives.

The industry, accordingly, is in need for a multi-height air spring that includes means for efficiently, predictably, and reliably functioning at multiple heights. The desired air spring, moreover, must function at multiple heights and provide means for creating a higher spring rate at the higher heights and a lower spring rate at the lower heights. The optimum air spring ideally should achieve these objectives in a design that is cost-effective to manufacture, assembly, deploy, and maintain.

SUMMARY OF THE INVENTION

An air spring having a relatively low and a relatively high spring height is disclosed to include a retainer, a base housing, an elastomeric sleeve secured to the retainer at a first end and secured to the base housing at a lower end to form a chamber, the elastomeric sleeve expanding from a relatively collapsed configuration at the low air spring height into an expanded configuration at the high air spring height. A confined bladder is disposed within the chamber, the bladder being inflatable to displace a variable portion of an expanded volume within the sleeve chamber at the high air spring height. The spring rate of the air spring is adjusted by an adjustment to the volume of air displaced by the inflated bladder within the sleeve chamber and by over-pressurizing the bladder relative to the air spring pressure, whereby the air spring functions to provide a relatively low spring rate at the lower height(s) and a relatively high spring rate at the higher height(s).

BRIEF DESCRIPTION OF THE DRAWINGS

The invention will be described by way of example and with reference to the accompanying drawings in which.

DETAILED DESCRIPTION OF THE INVENTION

Figure 1:
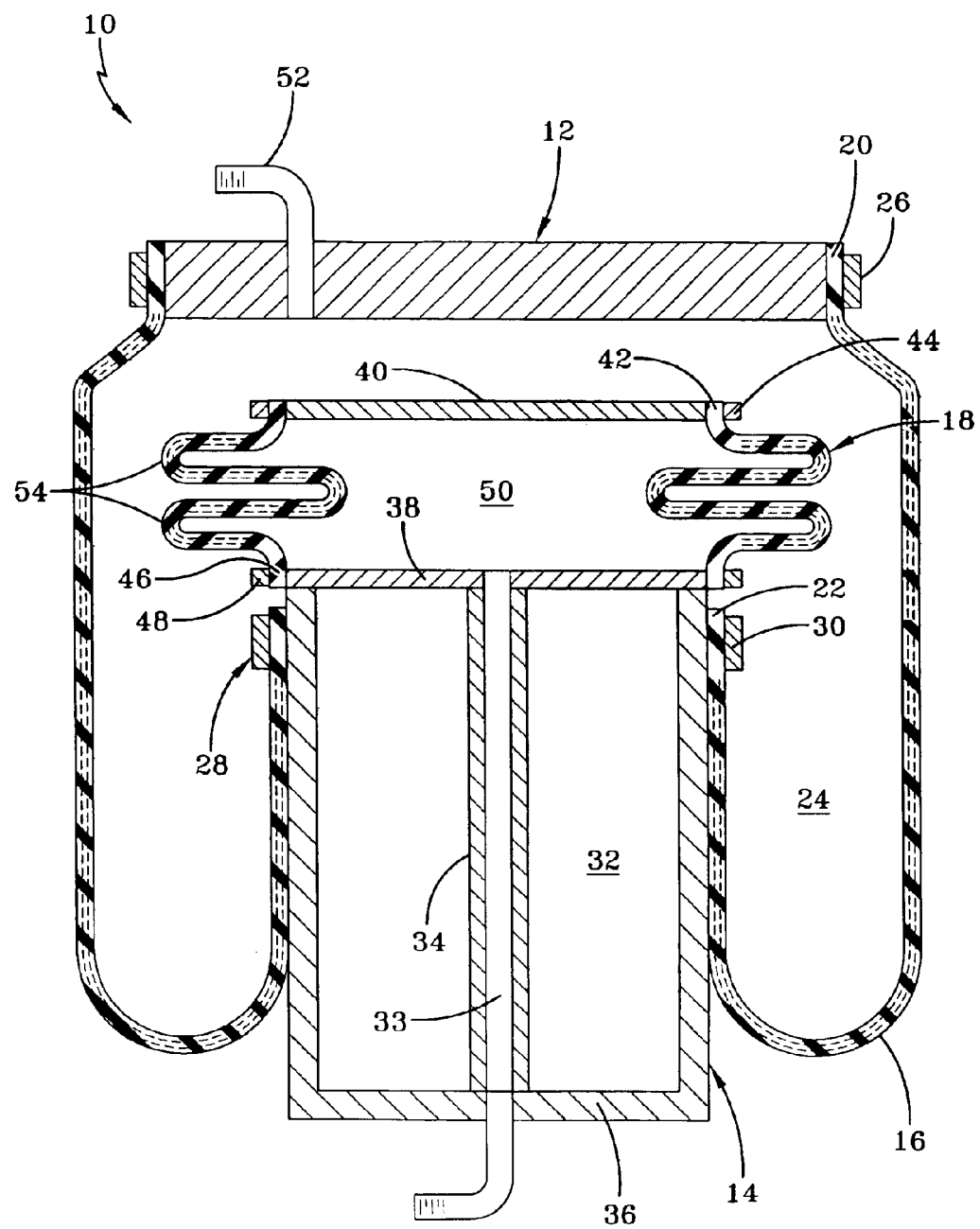
FIG. 1 is a transverse section view through a first embodiment of an air spring configured pursuant to the invention and shown in the collapsed condition.

FIG. 1 illustrates the inventive air spring 10. The air spring 10 has four main components: the upper retainer 12, the piston 14, the elastomeric sleeve 16, and the internal bladder 18. The elastomeric sleeve 16 is secured at first end 20 to the upper retainer 12 and to the piston 14 at the opposing end 22, forming a chamber 24.

The elastomeric sleeve 16 is preferably comprised of at least 3 plies: an outer elastomeric ply, at least one reinforcing ply formed of elastomeric embedded reinforcing cords, and an inner elastomeric ply. In the illustrated sleeve 16, upper end 20 of the sleeve 16 is secured onto the upper retainer 12 by means of a clamping ring 26 in a conventional manner, similar to that disclosed in U.S. Pat. No. 5,005,808. Alternatively, the upper sleeve end 20 may have an inextensible bead about which the upper retainer 12 is crimped for securing the sleeve end 20, similar to those disclosed in U.S. Pat. No. 5,535,994 or 5,580,033. Similarly, the lower sleeve end 22 is secured to the piston 14 at the clamping region 28 of the piston by means of a clamping ring 30. Alternatively the ends of the sleeve may be secured to the upper retainer 12 or piston 14 by any other attachment methods that are commonly known in the air spring or hose industries.

When the air spring 10 is in use, the upper retainer 12 and the piston 14 move axially toward and away from each other, and the sleeve 16 travels up and down the sides of the piston; however, the sides of the piston 14 may flare out or flare in as needed to tune the suspension performance. The piston 14 has an internal chamber 32 and an axial bore 33 extending therethrough. The bore 33 is defined by cylindrical walls 34 extending from a lower piston wall 36 to an upper piston wall 38.

The bladder 18 resides within the sleeve 16 as shown in FIGS. 1–4, and an upper bladder retainer 40 provided to which an upper bladder end 42 is attached by clamping ring 44 or any other suitable means. A lower bladder end 46 similarly to sleeve 16 attaches to the piston 14 by means of claiming ring 48 or other suitable means. The bladder is fabricated similar to the sleeve 16 in the ply construction of preference described above. The upper and lower ends of the bladder 18 are connected in sealed fashion to the retainer 40 and piston 14 so as to define an internal chamber 50.

An air inlet 52 extends through the upper sleeve retainer 12 and provides the access means by which to inflate and deflate sleeve chamber 24. Similarly, the axial bore 33 extending through piston 14 communicates with the chamber 50 of the bladder 18 and provides the access means by which to inflate and deflate the bladder 18. It should be noted that air inlet 52 and piston bore 33 are functionally independent so as to allow the sleeve and bladder to be inflated to differing pressures as will be described below.

Figure 2:
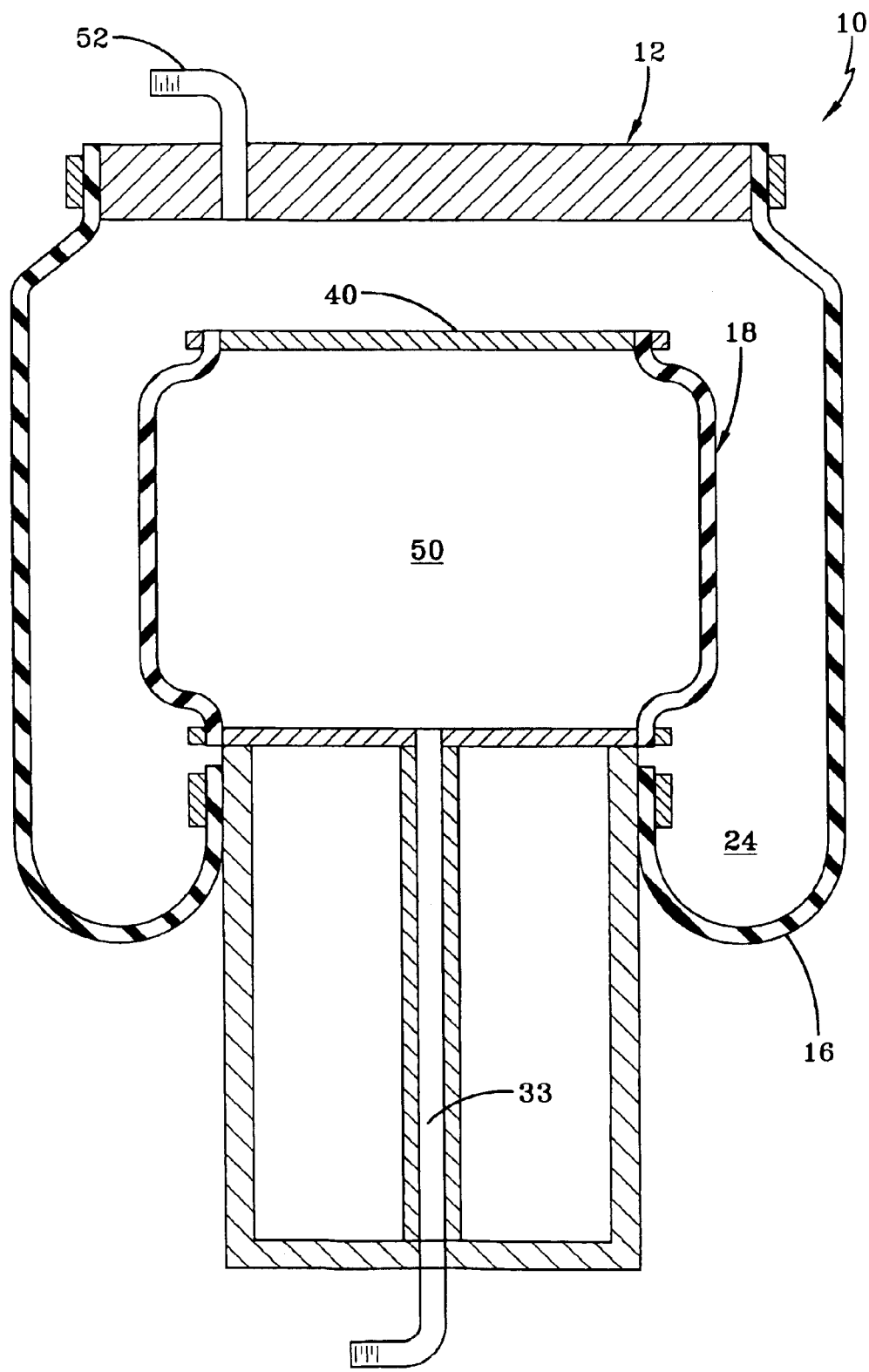
FIG. 2 is a transverse section view thereof shown in the expanded or inflated second height condition.

The sleeve 16 and bladder 18 are variable volume chambers and may be selectively inflated from the deflated condition shown in FIG. 1 into the inflated configuration shown in FIG. 2. The bladder 18 is folded into a bellows configuration in the deflated state shown in FIG. 1. In the bellows configuration, the bladder 18 includes multiple bellows folds 53 as shown.

Figure 4:
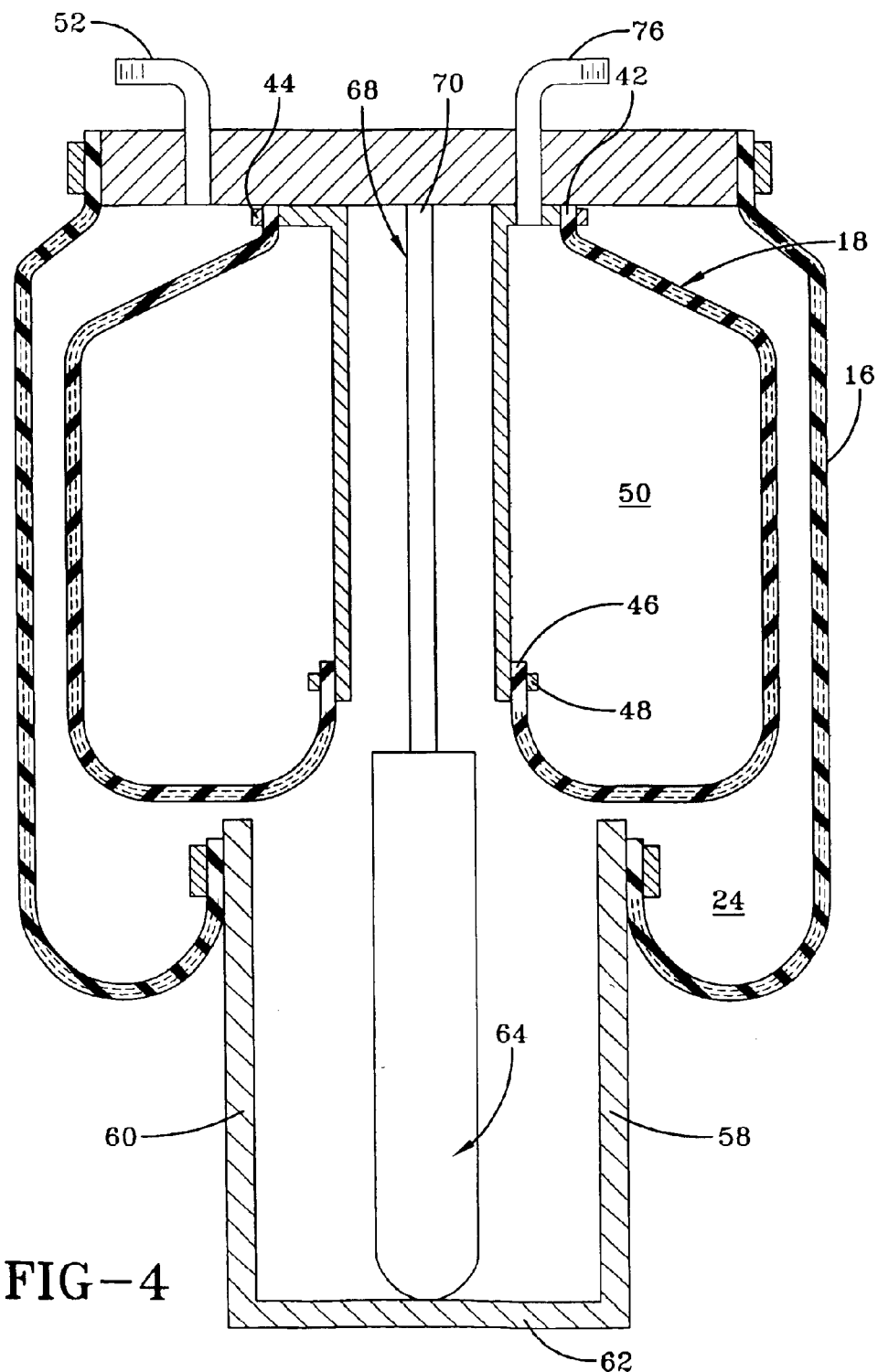
FIG. 4 is a transverse section view through the air spring of FIG. 3 shown in the expanded or inflated second height condition.

FIGS. 4 and 5 show another embodiment of the present invention. In FIGS. 4 and 5 an air spring has an upwardly open piston housing 56 defined by opposite sidewalls 58, 60 and a lower wall 62. A shock absorber 64 is mounted through the center of the spring, a configuration common in vehicular suspension design. The shock absorber includes a cylinder 66 positioned within housing 56 and a reciprocating rod 68 secured at an upper end 70 to the upper retainer 12. A cylindrical mounting bracket 72 is affixed at an upper end along radially extending outer edge flanges 74 to an underside of upper retainer 12. An air inlet 76 extends through the upper retainer and flange 74 to communicate with inner chamber 50. The upper end 42 of the bladder 18 is attached to outer ends of flange 74 by means of clamping ring 44. The lower end 46 is attached to a lower end of the bracket 72 by means of clamping ring 48. Other attachment means known to those skilled in the art may be employed if so desired.

Figure 3:
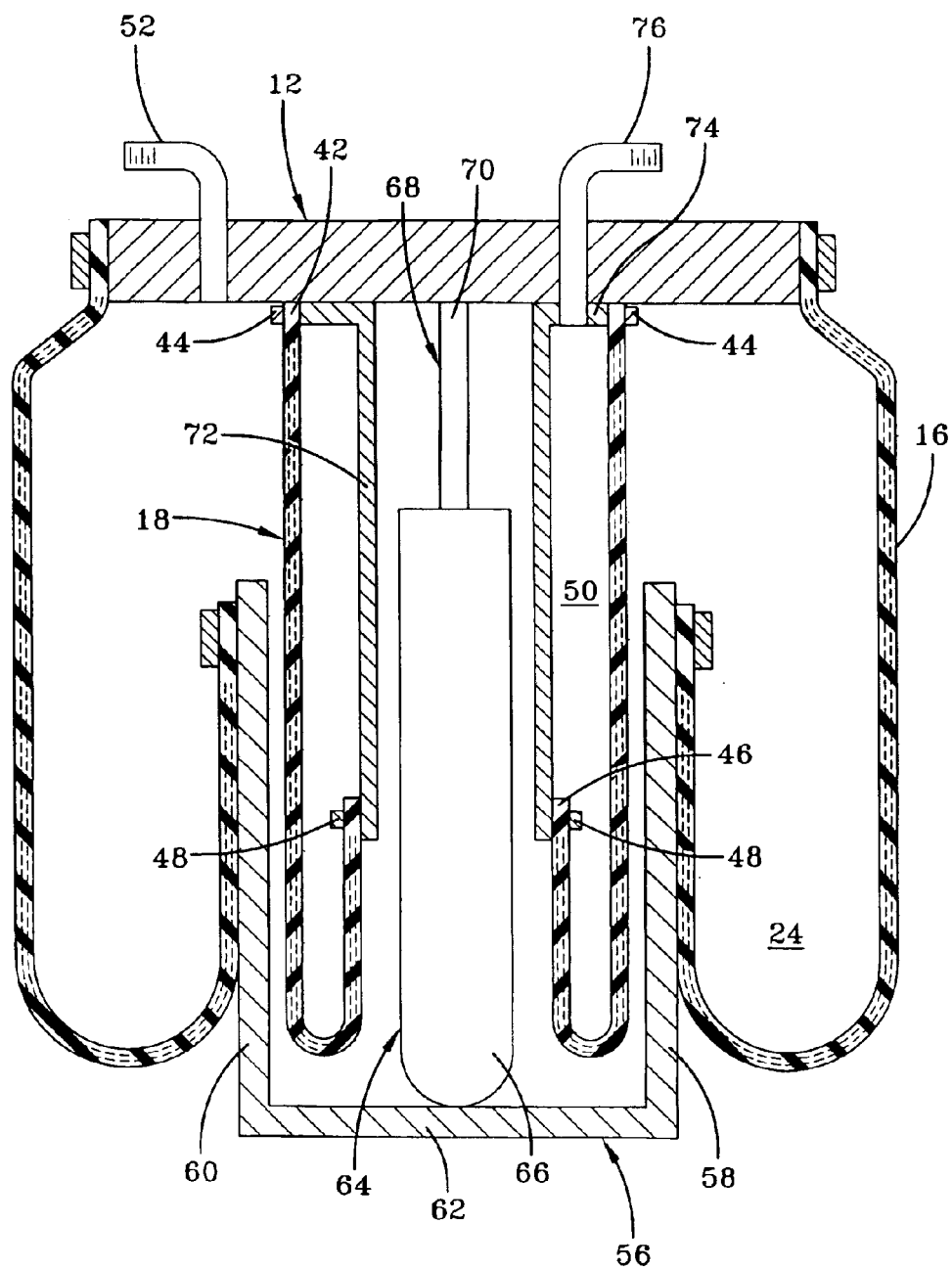
FIG. 3 is a transverse section view through a second alternate embodiment of an air spring configured pursuant to the invention and shown in the collapsed condition.

FIG. 3 shows the alternative embodiment in the "low suspension", deflated condition. Bladder 18 is substantially deflated and hangs along the outer sides of bracket 72. In the shown condition, the rod 68 to shock absorber 64 is retracted within cylinder 66 and the upper retainer 12 is in the "down" position. FIG. 4 shows the alternative embodiment in the "high suspension", inflated condition. The bladder 18 is inflated within the sleeve 16 by air admitted under pressure through inlet 76. Likewise, the sleeve 16 is inflated by air admitted under pressure through inlet 52. As shown, bladder 18 is in a non-contacting relationship with the outer sleeve 16 in each condition represented by FIGS. 1–4, inclusive.

The subject air spring can be controlled to operate at two different suspension heights represented in the preferred embodiment by FIGS. 1 and 2, and in the alternative embodiment by FIGS. 3 and 4. The air spring specifically provides a lower spring rate at the lower suspension ride height and a higher spring rate at the higher suspension ride height. When an air spring is conventionally designed with sufficient air volume to provide a low spring rate at a low spring height, that same spring will have a much larger air volume when it is extended to a higher ride height. This larger air volume will cause the spring rate to be softer, which is undesirable in a vehicle riding at an extended suspension height. The purpose of the bladder 18 is to confine the additional air volume that is a result of extending an air spring, such that the spring rate will not be softened by the added volume.

It will be appreciated from FIGS. 1–4 that the subject invention employs a sleeve and retainer system that is designed for an automotive suspension system, and specifically designed to operate at multiple suspension ride heights. For the purpose of explaining the operation of the invention, two of such heights are designated as "high" and "low". The air spring sleeve forms a rolling lobe that rolls on a piston at either one or both ends of the spring. The piston(s) can either be cylindrical or have conical tapers that will either increase the spring rate with a positive taper or decrease the spring rate with a negative taper.

A multi-ride height air spring will have the sleeve lobe rolling over different portions of the piston(s) at each ride height, and these different piston portions can have specific conical tapers to influence the spring rate at that ride height.

With a multi-ride height suspension, it is often desirable to have a higher suspension spring rate at the taller suspension ride heights, to improve vehicle stability, safety, and ride comfort when driving over uneven surfaces, such as off-road. As air springs move from the shorter height to the taller height, however, as explained above, the larger amount of internal air volume reduces the spring rate of the air spring beyond the capability of design tools such as piston tapering or other air spring shaping to correct. From the following equation, it will be understood that the spring air volume is a dominant variable:

$$K = \frac{N * P_{abs} * AE^2}{V} + P_g * (d\,AE/d\,X)$$

Where:
K=spring rate
N=polytropic gas constant 1.41 for air
$P_{abs}$=absolute gas pressure at midpoint of stroke
V=gas volume at midpoint of stroke
$P_g$=gas gauge pressure at midpoint of stroke
X=total air spring stroke around the midpoint
AE=Effective Area of the air spring at the midpoint of stroke (load/air pressure=effective area)
dAE/dX=change in effective area divided by stroke (an effect of piston or spring tapering)

The bladder 18 serves to capture the additional internal air volume created when the air spring extends to the taller ride height of FIGS. 2 and 4 from the lower heights of FIGS. 1 and 3. This captured air within bladder 18 makes the air unavailable for softening the spring rate of the air spring. The bladder 18 is mounted inside the air spring sleeve 16 and will operate at either 0 psig or at a pressure significantly (10 to 50 psi) higher than the pressure in the suspension air spring sleeve 16. The air pressure within the bladder is independently controllable from the air pressure placed within the sleeve 16. At the lower ride height, the inner bladder is collapsed by the high air pressure in the surrounding suspension air spring sleeve, and the bladder occupies a minimal volume inside the air spring. The air spring including sleeve 16 is designed pursuant to conventional principles to have adequate size and shape to support the suspension load and provide the desired spring rate at this ride height.

When the suspension control system (not shown) drives the suspension to a higher ride height, high pressure air (preferably 10 to 50 psi higher than the pressure in the suspension air spring sleeve) is introduced into the internal bladder. The psi values set forth herein are preferably but the invention is not intended to be limited thereto. The bladder expands and eventually reaches its maximum length, diameter, and design volume as determined by the fabric reinforcement with which it is built. As the bladder is expanding, it increases the air pressure in the surrounding air spring by compression, and this forces air within the spring to achieve the required load support air pressure at the extended ride height. Once the desired taller ride height is reached, the control system may have to either vent or add some air to the air spring sleeve to achieve the required load support air pressure at the extended ride height.

It will be noted from FIGS. 1–4 that the inner bladder is not tall enough when fully inflated to contact both ends of the air spring, and therefore does not directly act as a spring in the suspension. Since the inner bladder is deliberately "overpressurized" relative to the air pressure in the suspension air spring sleeve, its air volume means virtually unchanged during the cyclic air spring movements, and accompanying air spring cyclic volume/pressure changes. Therefore, the inner bladder volume does not contribute to softening of the spring rate of the suspension air spring. Without the spring rate softening effect from the additional air volume in the inner bladder, other air spring design tools such as piston or spring tapering can be used to effectively increase the spring rate of the suspension at the extended air spring ride height.

It will further be noted that the two embodiments of the invention shown in FIGS. 1–2 and 3–4 are not the only alternative embodiments possible. Also, the pressure ranges given above are intended to be representative and not restrictive of the scope of the invention. In FIGS. 1 and 2, the bladder is a sleeve that is molded with a bellows shape such that it can fold into a compact shape when compressed by deflation. In FIGS. 3 and 4, the air spring is modified to incorporate the shock absorber mounted through the center of the spring. In this embodiment, the bladder is a rolling lobe sleeve that is molded such that it lengthens and contracts in diameter when deflated.

From the foregoing, it will be apparent that the subject invention accomplishes the needs of the industry for a multi-height air spring that includes means for efficiently, predictably, and reliably functioning at multiple heights. The subject air spring, moreover, functions at multiple heights and provides means for creating a higher spring rate at the higher heights and a lower spring rate at the lower heights. The subject air spring optimizes and meets criteria that required tradeoffs in the prior art. A present air spring, moreover, is achieved in a design that is cost-effective to manufacture, assembly, deploy, and maintain. The invention is particularly useful for off-road capable SUV suspensions by providing a comfortable ride at a low ride height for good fuel economy and good vehicle stability while driving on streets and highways. When desired, the invention allows the use of an extended ride height with stiffer spring rates for off-road driving with good vehicle clearance and good vehicle stability on uneven surfaces.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An air spring comprising a retainer, a base housing, an elastomeric sleeve secured to the retainer at a first end and secured to the base housing at a lower end to form a chamber, the elastomeric sleeve expanding from a retracted condition into an expanded condition, the air spring being characterized by:
   a confined bladder within the chamber and defining a bladder chamber, the bladder chamber expanding from a collapsed condition to an inflated condition to displace at least a portion of an expanded volume within the sleeve chamber and adjust the spring rate of the air spring in the expanded sleeve condition and the bladder chamber in the inflated condition having a length less than a spacing between the retainer and the base housing.

2. An air spring in accordance with claim 1, wherein the air spring operates at a lower spring rate with the sleeve in the retracted position and a higher spring rate with the sleeve in the expanded position.

3. An air spring in accordance with claim 1, wherein the air spring has a lower relative height with the sleeve in the retracted condition and a higher relative height with the sleeve in the expanded condition.

4. An air spring in accordance with claim 1, wherein the bladder is substantially at 0 psig in the collapsed condition.

5. An air spring in accordance with claim 4, wherein the bladder in the inflated condition is overpressurized relative to the air pressure in the sleeve chamber.

6. An air spring in accordance with claim 1, wherein the bladder is in a non-contacting relationship with the sleeve in the inflated condition.

7. An air spring in accordance with claim 1, wherein the bladder has a pressure substantially higher than the surrounding chamber air pressure inside the elastomeric sleeve chamber.

8. An air spring in accordance with claim 1, wherein the bladder substantially conforms into a bellows shape in a collapsed condition.

9. An air spring in accordance with claim 1, wherein the bladder substantially comprises a rolling lobe sleeve configuration that lengthens and contracts in diameter when inflated and deflated, respectively.

10. An air spring having at least a relatively low and a relatively high spring height and an adjusted spring rate at each said height, the air spring comprising:
    a retainer, a base housing, an elastomeric sleeve secured to the retainer at a first end and secured to the base housing at a lower end to form a chamber, the elastomeric sleeve expanding from a relatively collapsed configuration at the low air spring height into an expanded configuration at the high air spring height; and
    a confined bladder within the chamber, the bladder being inflatable to displace at least a portion of an expanded volume within the sleeve chamber at the high air spring height to adjust the spring rate of the air spring at the high air spring height; and
    the confined bladder being secured to the base housing at a lower end and having a second free end within the elastomeric sleeve distanced from the retainer.

11. An air spring in accordance with claim 10, wherein the air spring having a relatively low spring rate at the low spring height and a relatively high spring rate at the high air spring height.

12. An air spring in accordance with claim 10, wherein the bladder is in a non-contacting relationship with the sleeve at the high and low air spring heights.

13. An air spring in accordance with claim 12 wherein the bladder and the sleeve have a lower end secured to a piston.

14. An air spring in accordance with claim 10, wherein the bladder is inflated to a substantially greater relative pressure than the sleeve chamber pressure at the high air spring height.

15. An air spring in accordance with claim 10, wherein the bladder substantially assumes a bellows shape at the low air spring height.

16. An air spring in accordance with claim 10, wherein the bladder is substantially a rolling lobe sleeve that lengthens and contracts in diameter when inflated and deflated, respectively.

17. An air spring in accordance with claim 10, wherein the spring rate of the air spring is adjusted by an adjustment to the volume of bladder inflation within the sleeve chamber and maintenance of an air pressure within the bladder substantially greater than the air pressure in the air spring chamber.

18. An air spring in accordance with claim 17, wherein the bladder is substantially at 0 psi air pressure in a collapsed condition and at a pressure ranging between 10 to 50 psi greater than the air pressure of the air spring chamber in an inflated condition.

19. An air spring comprising first and second end components and an elastomeric sleeve secured at first and second ends to the first and second end components, respectively, to form a chamber, the elastomeric sleeve expanding from a retracted condition into an expanded condition, the air spring being characterized by:

a confined bladder within the chamber and defining a bladder chamber, the bladder chamber expanding from a collapsed condition to an inflated condition to displace at least a portion of an expanded volume within the sleeve chamber and adjust the spring rate of the air spring in the expanded sleeve condition and the bladder chamber in the inflated condition remaining in a non-contacting relationship with one said air spring end components between the collapsed condition and the inflated condition.

20. An air spring according to claim 19 wherein the confined bladder has a length insufficient to span between both air spring components in the inflated condition.

* * * * *